United States Patent
Kim et al.

(10) Patent No.: US 8,430,598 B2
(45) Date of Patent: Apr. 30, 2013

(54) METHOD OF REMEDIATING CYANIDE-CONTAMINATED SOIL

(75) Inventors: Jae-Gon Kim, Daejeon (KR);
Jung-Hwa Lee, Daejeon (KR);
Young-Woo Choi, Daejeon (KR);
Yong-Chan Cho, Daejeon (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 376 days.

(21) Appl. No.: 12/756,739

(22) Filed: Apr. 8, 2010

(65) Prior Publication Data
US 2011/0176873 A1 Jul. 21, 2011

(30) Foreign Application Priority Data
Jan. 15, 2010 (KR) .................. 10-2010-0003804

(51) Int. Cl.
*A62D 3/38* (2007.01)
*B09C 1/08* (2006.01)
*C01C 3/08* (2006.01)
*C01C 3/12* (2006.01)

(52) U.S. Cl.
USPC ...... 405/128.75; 423/367; 423/371; 423/372; 588/313

(58) Field of Classification Search .................. 423/367, 423/372, 377, 379, 371; 405/128.8; 588/313
See application file for complete search history.

(56) References Cited

U.S. PATENT DOCUMENTS
6,276,871 B1 * 8/2001 Bruso ..................... 405/128.5

FOREIGN PATENT DOCUMENTS
JP  2004058011 A  *  2/2004

OTHER PUBLICATIONS

Ojeka et al. "Studies on Solvent Extraction of Free Hydrogen Cyanide From Ricer Water" Bull. Chem. Soc. Ethip. 2007 21(3).*

* cited by examiner

*Primary Examiner* — Wayne Langel
*Assistant Examiner* — Syed Iqbal
(74) *Attorney, Agent, or Firm* — Ladas & Parry LLP (57) ABSTRACT

Provided is a method of remediating cyanide-contaminated soil. The method is provided to remediate soil contaminated with cyanide and treat the cyanide, which includes collecting the soil contaminated with first cyanide in a solid state and second cyanide in a gaseous or dissolved state, dissociating cyanide by mixing the soil with an alkali washing solution, dissolving the first cyanide in a solid state in the washing solution, and transferring the second cyanide in a dissolved state dissociated from the soil to the washing solution, dissociating the soil from the washing solution, precipitating the first cyanide in a solid state by acidifying the washing solution containing the cyanide, and performing post-treatment on the first cyanide after the first cyanide precipitated in a solid state is dissociated from the washing solution.

20 Claims, 4 Drawing Sheets

| CONCENTRATION OF CYANIDE IN CONTAMINATED SOIL | CONCENTRATION OF CYANIDE IN SOIL AFTER WASHING | TOTAL CONCENTRATION OF CYANIDE IN WASHING SOLUTION | CONCENTRATION OF FREE CYANIDE IN WASHING SOLUTION |
|---|---|---|---|
| 85.7mg/kg | 0.71mg/kg | 25.2mg/L | 0.32mg/L |

FIG. 6

| TOTAL CONCENTRATION OF CYANIDE | CONCENTRATION OF FREE CYANIDE | CONCENTRATION OF FREE CN AFTER $H_2O_2$ REACTION | TOTAL CONCENTRATION OF CYANIDE AFTER pH ADJUSTMENT USING $H_2SO_4$ | FINAL TOTAL CONCENTRATION OF CYANIDE AFTER FE INPUT |
|---|---|---|---|---|
| 25.2mg/L | 0.32mg/L | ND | 1.9mg/L | 0.27mg/L |

METHOD OF REMEDIATING CYANIDE-CONTAMINATED SOIL

CROSS-REFERENCE TO RELATED APPLICATION

This application claims priority to and the benefit of Korean Patent Application No. 2010-0003804, filed 15, Jan. 2010, the disclosure of which is incorporated herein by reference in its entirety.

BACKGROUND OF THE INVENTION

1. Field of the Invention

The present invention relates to a method of remediating contaminated soil, and more particularly, to a method of remediating cyanide-contaminated soil in which cyanide-contaminated soil is remediated and cyanide in the soil is treated.

2. Description of Related Art

It is reported that cyanide is used in various applications such as mining, surface treatment for metal, production of aluminum and iron, and manufacture of agricultural pesticides, and as of 2001, 950000 tons of cyanide has been produced worldwide.

Cyanide has a bad impact on humans and the ecosystem. For example, when KCN or NaCN enters a human body through an oral route, HCN is released by gastric acid, and when HCN is absorbed into a human body such as a mucous membrane or lung, it inhibits oxygen delivery driven by hemoglobin. As a result, if more than a predetermined amount of cyanide is absorbed in the human body, difficulty in breathing or respiratory paralysis could result. As described above, cyanide has a bad impact on humans and the ecosystem, and thus an effluent standard for waste water is set lower than 0.01 mg/L according to the water quality standards, and a content of cyanide in soil is also restricted to less than 2 mg/kg by the soil environment conservation act.

However, a considerably wide range of soil is contaminated due to the leakage of cyanide from plating plants or metal treatment plants, or the disposal of cyanide-containing waste exceeding the standard. Thus, remediation of the cyanide-contaminated soil is required.

Purification of the cyanide-contaminated soil is performed using various processes such as room temperature oxidation, high temperature degradation and biological degradation. The biological degradation is highly economical since it is a low-cost process, but takes a long period of time. The high temperature degradation is applied for soil contaminated with cyanide which has a high concentration and low solubility. This process is efficient in treating the contaminated soil but should be performed at high temperature, and thus requires high cost. For this reason, it is not good for treating soil in a large scale. The room temperature oxidation is a lower cost process than the high temperature degradation, which is suitable for soil contaminated with cyanide having a low concentration that is easily degradable. However, it is not suitable for high concentration cyanide or solid-state cyanide.

In other words, the room temperature oxidation is a technique of injecting an oxidizing agent such as hydrogen peroxide or ozone into contaminated soil to degrade cyanide. It is known that the oxidizing agent such as hydrogen peroxide or ozone has a very low degradation capability to solid cyanide having a low solubility and strong acid dissociable (SAD) CN such as $Fe(CN)_6^{4-}$. However, there are various limitations to remediating cyanide-contaminated soil using the room temperature oxidation since most of cyanide included in soil is a solid SDA-type.

There is also a problem in treating easily-degradable low-concentration cyanide. That is, an oxidizing agent injected into soil is consumed to degrade cyanide, and a significant amount of the oxidizing agent is also consumed by organic materials, manganese oxide and sulfide minerals contained in the soil. For this reason, to obtain a desirable result, a larger amount of an oxidizing agent than a substantially required amount of the oxidizing agent should be injected into contaminated soil.

Therefore, development and application of a technique capable of remediating cyanide-contaminated soil in a short time at a low cost at room temperature are needed.

SUMMARY OF THE INVENTION

The present invention is directed to a method of remediating cyanide-contaminated soil capable of economically treating cyanide included in the soil at room temperature, and particularly, effectively removing solid cyanide having a low solubility from the soil.

One aspect of the present invention provides a method of remediating cyanide-contaminated soil, which is employed to remediate soil contaminated with cyanide and treating the cyanide. The method includes: collecting the soil contaminated with first cyanide in a solid state and second cyanide in a gaseous or dissolved state; dissociating cyanide by mixing the soil with an alkali washing solution, dissolving the first cyanide in a solid state in the washing solution, and transferring second cyanide in a dissolved state dissociated from the soil to the washing solution; dissociating the soil from the washing solution; precipitating the first cyanide in a solid state by acidifying the washing solution containing the cyanide; and performing post-treatment on the first cyanide after the first cyanide precipitated in a solid state is dissociated from the washing solution.

According to the present invention, an oxidizing agent may further be added to the washing solution dissociated from the solid to oxidize the second cyanide and acidify the washing solution, thereby removing the second cyanide.

In addition, according to the present invention, during the dissociation of the cyanide, the washing solution may have a pH of 9 to 12, and preferably a pH of 11 to 12.

According to the present invention, the washing solution may be a phosphate solution such as pyrophosphate ($P_2O_7^{4-}$), having a concentration of 30 to 50 mM.

According to the present invention, during the removal of the first cyanide, a sulfuric acid solution may be input to oxidize the washing solution, and an ionic acid may be added to the washing solution.

According to the present invention, after the removal of the remaining cyanide, the washing solution may be adjusted in pH and concentration to be reused in the dissociation of the cyanide.

BRIEF DESCRIPTION OF THE DRAWINGS

The above and other objects, features and advantages of the present invention will become more apparent to those of ordinary skill in the art by describing in detail preferred embodiments thereof with reference to the attached drawings in which:

FIGS. 5 and 6 are tables showing a result of an experiment on a method of remediating cyanide-contaminated soil according to an exemplary embodiment of the present invention, of which

DETAILED DESCRIPTION OF THE INVENTION

Hereinafter, the present invention will be described with reference to the accompanying drawings in detail. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification. In the drawings, the thickness of layers and regions are exaggerated for clarity.

A method of remediating cyanide-contaminated soil according to an exemplary embodiment of the present invention will be described in further detail with reference to the accompanying drawings.

Figure 1:
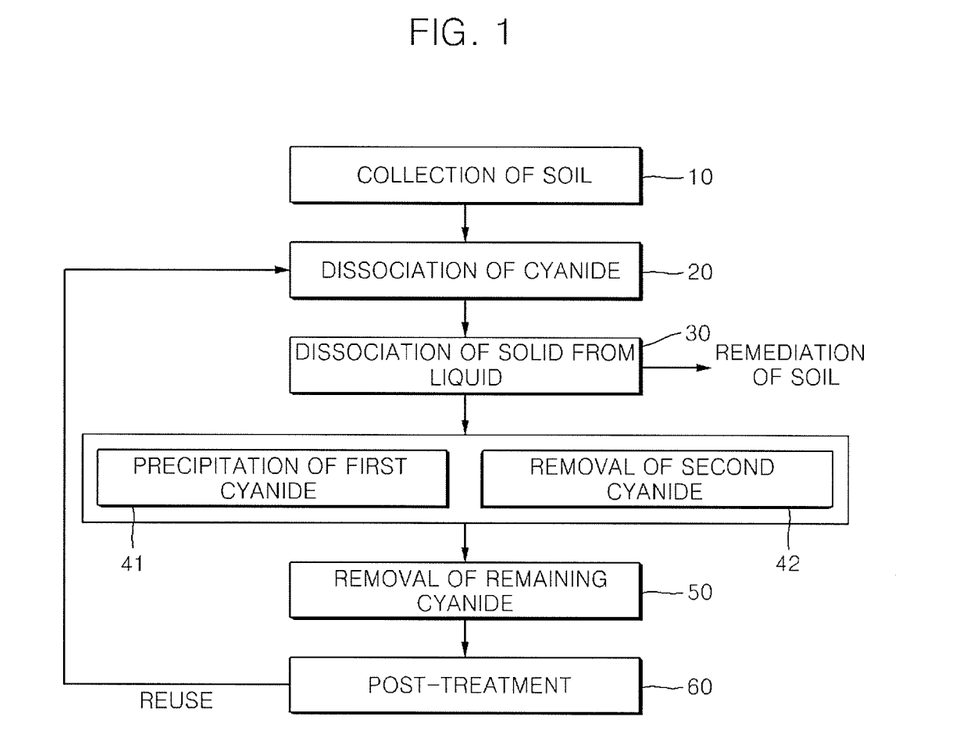
FIG. 1 is a schematic flowchart illustrating a method of remediating cyanide-contaminated soil according to an exemplary embodiment of the present invention.
Figure 2:
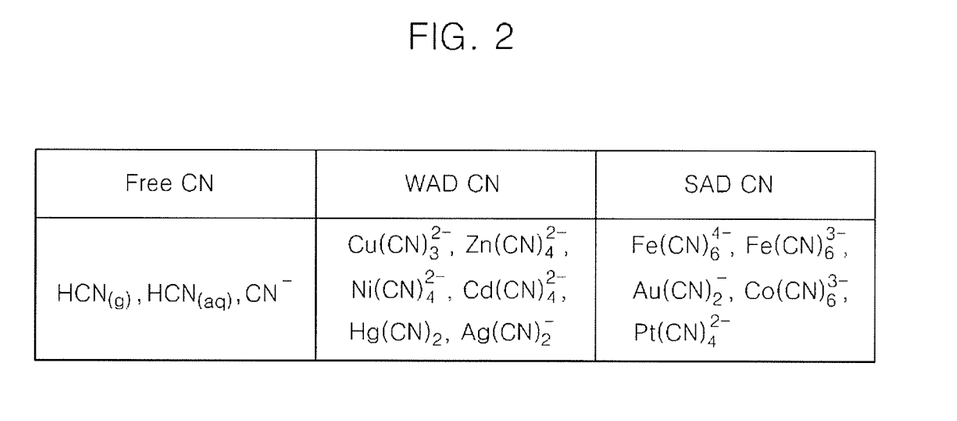
FIG. 2 is a table showing types of cyanide which can be present in soil.

FIG. 1 is a schematic flowchart illustrating a method of remediating cyanide-contaminated soil according to an exemplary embodiment of the present invention, and FIG. 2 is a table showing types of cyanide which can be present in soil.

Referring to FIG. 1, a method 100 of remediating cyanide-contaminated soil according to an exemplary embodiment of the present invention includes processes of dissociating cyanide 20, dissociating a solid from a liquid 30, precipitating first cyanide 41, removing second cyanide 42, and removing remaining cyanide 50.

To perform the method 100 of remediating cyanide-contaminated soil according to the exemplary embodiment of the present invention, first, a process of collecting soil 10 is performed. In the process of collecting soil 10, soil contaminated with cyanide is collected using an excavator. Cyanide-contaminated soil is usually found on the periphery of mining plants, plating plants, or plants producing aluminum or iron.

Referring to FIG. 2, cyanide is present in soil in various forms. That is, cyanide may be present in soil in a solid, dissolved or gaseous state, and classified into weak acid dissociable (WAD) cyanide, strong acid dissociable (SAD) cyanide and free cyanide according to properties.

That is, the free cyanide is present in a gaseous state or as an ionized CN— in an aqueous solution, and gaseous HCN is very easily soluble in water. The WAD cyanide is formed by bonding cyanide to a metal such as $Cu(CN)_3^{2-}$ or $Zn(CN)_4^{2-}$. The WAD cyanide has a low bonding strength between the metal and the cyanide, and thus is easily soluble in an environment having a pH of 4 to 6.

Therefore, the WAD cyanide can be easily changed from a solid state to a dissolved state depending on the surrounding environment. The SAD cyanide is formed by bonding cyanide to a heavy metal such as iron, cobalt or platinum like $Fe(CN)_6^{4-}$ and $Au(CN)_2^-$. Compared to the WAD cyanide, the SAD cyanide has a very strong bonding strength between the cyanide and the metal, and thus has a very low solubility to an acid and is soluble only in an acid having a pH of about less than 2. Therefore, in neutral and acidic environments, the SAD cyanide is stably present in a solid state.

That is, the WAD cyanide and the free cyanide are usually present in gaseous and dissolved states, and the SAD cyanide is usually present in a solid state. Such a difference is caused by its solubility characteristic.

Hereinafter, for convenience of description, the solid cyanide is referred to as first cyanide, and the gaseous or dissolved cyanide is referred to as second cyanide. Here, the first cyanide is mostly SAD cyanide, but may be WAD cyanide present in a solid state depending on environment conditions. Further, the second cyanide is mostly WAD cyanide or the free cyanide, but sometimes may be SAD cyanide depending on environment conditions.

As described above, while the cyanide can be present as the first cyanide in a solid state or the second cyanide in the dissolved and gaseous state in soil, in the soil, most of the cyanide is substantially present as the first cyanide in the solid state, and only a trace of cyanide is present as the second cyanide. Accordingly, during the process of collecting soil 10, the excavated soil contains a far larger amount of the first cyanide in the solid state than the second cyanide. Particularly, among the first cyanide, an iron-cyanide compound such as $Fe_4[Fe(CN)_6]_3$, $Fe_3[Fe(CN)_6]_2$, $Fe[Fe(CN)_6]$, or $Fe_2[Fe(CN)_6]$ is frequently found, which are known as materials for adjusting a cyanide concentration of soil pore water.

After the soil is collected, the process of dissociating cyanide 20 from the soil is performed. During the process of dissociating cyanide 20, first cyanide and second cyanide are dissociated from the soil using a washing solution. Here, as described above, the solid-state first cyanide has a very low solubility in an acidic or neutral environment, but as shown in Formulae (1) and (2), has a quite high solubility to an alkali solution.

$$Fe_4[Fe(CN)_6]_{3(s)}+12H_2O=4Fe(OH)_{3(s)}+3Fe(CN)_6^{3-}+3e^-+12H^+ \quad \text{Formula (1)}$$

$$3Fe_4[Fe(CN)_6]_{3(s)}+32H_2O \leftrightarrow 4Fe(OH)_{8(s)}+5Fe(CN)_6^{4-}+32H^+ \quad \text{Formula (2)}$$

When the first cyanide meets an alkali washing solution, the first cyanide is dissociated into solid iron hydride and ionized iron cyanide. The ionized iron cyanide is dissolved in the washing solution.

Meanwhile, the second cyanide present in the dissolved state in the soil is adsorbed to a surface of manganese oxide, iron oxide, or a soil organic material by an electrical strength. The iron oxide, the manganese oxide, or the soil organic material is changed in surface charge according to peripheral pH. That is, it exhibits a positive charge at a lower pH than the point of zero charge (PZC), and a negative charge at a higher pH than the PZC. For example, since the surface charges are 0 when the iron oxide has a pH of about 7 to 9, the manganese oxide has a pH of 3 to 7, and the soil organic material has a pH of 3, in the environment having a pH of 9 or more, the surface charges of all of these materials exhibit negative charges. As a result, in the acidic or neutral environment having low pH, the iron oxide, the manganese oxide or the soil organic material exhibiting a positive charge on its surface is mixed with an alkali washing solution, and a surrounding environment is changed into alkali (particularly, a pH of 9 or more) so that its surface also exhibits a negative charge.

Under the acidic condition, the iron oxide, the manganese oxide or the soil organic material exhibits a positive charge on its surface, and thus can be electrically adsorbed to a cyanide anion. However, as the surrounding environment is changed into an alkali condition, an electrical bonding strength is lost, so that the cyanide ions are dissociated from the iron oxide, etc. and then transferred to a washing solution.

That is, when an alkali washing solution is mixed with the cyanide-contaminated soil, the solid-state first cyanide is dissolved in the washing solution, and the second cyanide electrically adsorbed to the iron oxide, etc. loses an electrical adsorption strength, resulting in being dissociated from the iron oxide, etc., and then is transferred to the washing solution. The iron cyanide erupted as ions from the first cyanide may also be adsorbed to the iron oxide, etc. in an instant, but loses an electrical adsorption strength, like the second cyanide, so that it is soluble in the washing solution.

Meanwhile, a trace of free cyanide is present in the soil. The free cyanide has a dominant form of HCN, which is very toxic, at a pH of less than 9.24, and a dominant form of $CN^-$ at a pH of more than 9.24. Here, high-toxicity HCN has strong volatility, so that it can be turned into HCN gas. For this reason, an environment of treating cyanide-contaminated soil can be dangerous. Thus, the process of dissociating cyanide 20 may be performed in the environment having a pH of 9 or more, that is, in the environment in which the pH of the washing solution may be 9 or more. Particularly, at a pH of 11 or more, the free cyanide is usually present as $CN^-$, and thus the stability of the treatment environment can be ensured.

To sum up, during the process of dissociating cyanide 20, to dissolve the first cyanide, the washing solution may be alkali, to dissociate the cyanide ions electrically adsorbed to the iron oxide, etc., the washing solution may have a pH of 9 or more, and to ensure the stability of the working environment, the washing solution may have a pH of 11 or more. As a result, to satisfy all of the conditions, an alkali solution having a pH of 11 or more may be used as the washing solution. The most important thing in this process is dissolution of the solid-state first cyanide. Thus, the necessary condition is that the washing solution be an alkali solution, preferably having a pH of 9 or more, and more preferably having a pH of 11 or more. When the pH of the washing solution is more than 12, compared to the condition having a pH of 11, it results in an increase in processing cost, with no significant improvement of solubility of the first cyanide and the working environment.

In the exemplary embodiment, as an alkali washing solution, a phosphate solution having a pH of 11 or more is used. That is, since phosphate ions in the phosphate solution are strongly bonded to metal ions, thereby forming a soluble complex salt, the soluble complex salt is easily bonded to the iron oxide, the manganese oxide or the soil organic material. The phosphate ions are bonded to the iron oxide, etc., the resulting product exhibits a negative charge as a whole, and thus the dissociation of the cyanide ions electrically adsorbed to the iron oxide, etc. can be accelerated. More specifically, the exemplary embodiment uses sodium-pyrophosphate ($Na_4P_2O_7 \cdot nH_2O$), which, compared to orthophosphate or hexametaphosphate, includes many phosphate ions, and can further stimulate the dissociation of the cyanide ions.

The present inventor tested whether cyanide in soil is easily erupted or not when sodium phosphate was used as a washing solution.

That is, a phosphate solution having a phosphate concentration of 0 to 100 mM was prepared using Na-orthophosphate, Na-hexametaphosphate, or Na-pyrophosphate, and adjusted to pHs of 10, 11, and 12 using 0.1N NaOH or 0.1N HCl. Next, 4 g of cyanide-contaminated soil reacted with 40 ml of 50 mM phosphate solution having a pH of 10 for 24 hours, and a total amount of erupted cyanide according to reaction time was estimated. The result is shown in FIG. 3.

Figure 4:
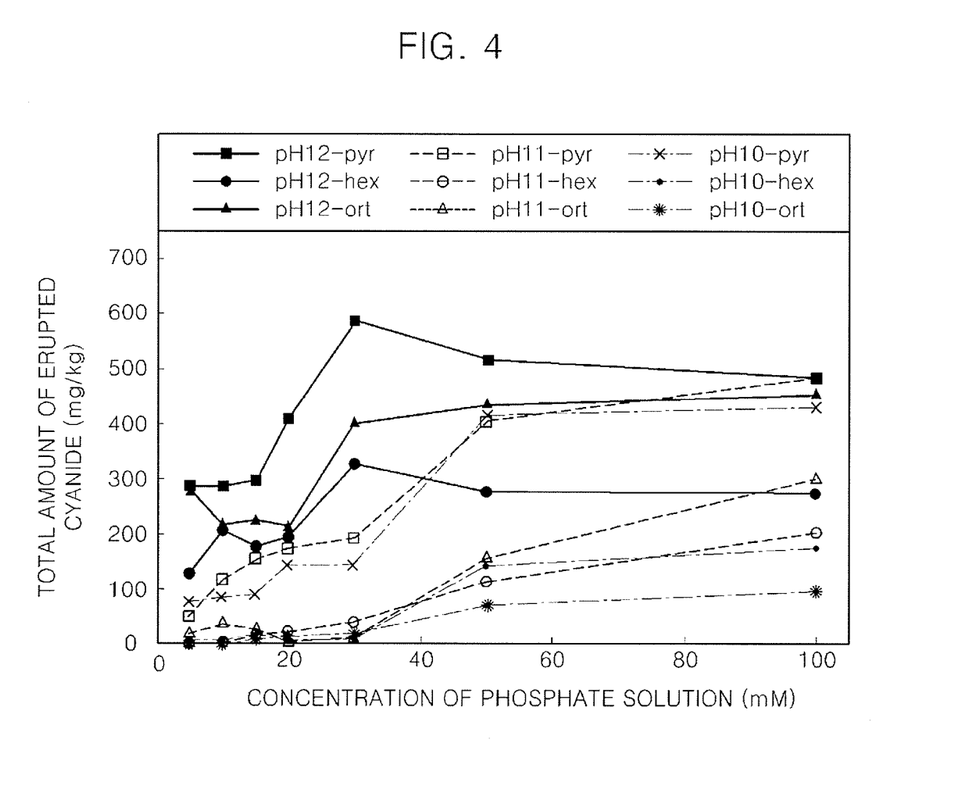
FIG. 4 is a graph showing a total content of cyanide erupted from soil according to the concentrations of phosphate solutions having various pHs during a process of dissociating cyanide.

4 g of cyanide-contaminated soil reacted with 40 ml of 0 to 100 mM phosphate solution having a pH of 10 to 12 for 24 hours, and the concentration and pH of cyanide were measured. The result is shown in FIG. 4. The concentration of cyanide was measured by a method according to the American Society for Experimenting Materials (ASTM).

Figure 3:
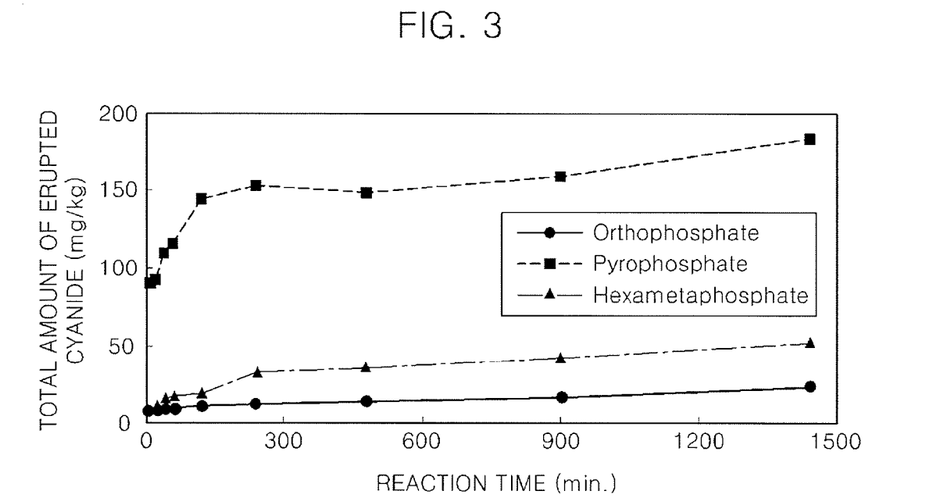
FIG. 3 is a graph showing a total content of cyanide erupted from soil according to time spent treating various types of a phosphate solution during a process of dissociating cyanide.

Referring to FIGS. 3 and 4, compared to the Na-orthophosphate and Na-hexametaphosphate solutions, much cyanide was erupted from the Na-pyrophosphate. Particularly, from the Na-pyrophosphate, the amount of erupted cyanide was drastically increased for up to 100 minutes from the beginning of the reaction, but after 100 minutes, gently increased.

It is confirmed that 90% or more of the total amount of cyanide erupted after the 24-hour reaction was SAD cyanide, 10% or less was WAD cyanide, and a trace amount was free cyanide. The contents of the erupted cyanide described above are almost the same as the contents of cyanide in soil by types. In addition, through the eruption experiment, it can be confirmed that almost all cyanide in soil was erupted. The cyanide erupted after the 24-hour reaction was increased as the concentration and pH of phosphate were increased.

When the pH of the phosphate solution was 12 and the concentration of phosphoric acid was increased up to 30 mM, the eruption amount of cyanide was drastically increased, but when the pH of the phosphate solution was 10 or 11, only after the concentration of phosphoric acid was increased up to 50 mM, did the eruption amount of the cyanide drastically increase. Therefore, when the concentration of phosphoric acid is optimized in the range of 30 to 50 mM by pH of the solution, cyanide can be economically erupted.

As described above, the process of dissociating cyanide 20 uses an alkali washing solution, and thus only cyanide is transferred to the washing solution, thereby dissociating the cyanide from the soil.

Afterwards, the washing solution may be dissociated from the soil to reuse the soil. That is, during the process of dissociating a solid from a liquid 30, a solid (soil) and a liquid (washing solution) are dissociated from each other by a known centrifugal separator using a difference in specific gravity. After the dissociation of the solid from the liquid, almost no cyanide is found in the soil, so that the soil can be reused to remediate. However, the washing solution containing the cyanide is treated through subsequent processes to be described below.

After the process of dissociating a solid from a liquid 30, first cyanide and second cyanide are removed from the washing solution. More specifically, the first cyanide and the second cyanide are removed through the processes of precipitating the first cyanide 41 and removing the second cyanide 42. The processes of precipitating the first cyanide 41 and removing the second cyanide 42 are accomplished by inputting an acid solution to the washing solution to acidify. Thus, the processes of precipitating the first cyanide 41 and removing the second cyanide 42 are not performed either sequentially or separately. That is, to perform the process of removing the second cyanide 42, first, an oxidizing agent is merely input to the washing solution to oxidize the WAD cyanide and the free cyanide, but the precipitation of the first cyanide and the removal of the second cyanide are simultaneously performed, which will be described in further detail below.

When an oxidizing agent such as hydrogen peroxide or ozone is input to the solid-liquid dissociated washing solution, the free cyanide and the WAD cyanide in the washing solution are oxidized as a type of $CNO^-$ through the reactions of Formulae (3) and (4).

$$CN^- + H_2O_2 \longrightarrow CNO^- + H_2O \qquad \text{Formula (3)}$$

$$M(CN)_4{}^{2-}{}_{(s)} + 4H_2O_2 + 2OH^- \longrightarrow 4CNO^- + 4H_2O + M(OH)_2 \qquad \text{Formula (4)}$$

Here, $CN^-$ of Formula (3) is free cyanide, M of Formula (4) is a metal such as copper or zinc, and $M(CN)_4{}^{2-}$ is WAD cyanide.

The oxidation reactions shown in Formulae (3) and (4) are easily performed under an alkali condition, and thus the free cyanide and the WAD cyanide in the alkali washing solution having a pH of 11 to 12 as described in the exemplary embodiment are very rapidly oxidized.

Meanwhile, another reason for oxidizing the free cyanide by inputting the oxidizing agent is to inhibit generation of high-toxicity HCN gas. That is, during the process of precipitating the first cyanide 41, which will be described below, an acid solution will be input to the washing solution. Here, if the free cyanide is not previously oxidized using the oxidizing agent, the free cyanide can react with the acid solution, thereby forming HCN having high toxicity. The HCN has strong volatility and thus can be turned into HCN gas, which may be harmful to humans. For this reason, the production of HCN will be inhibited using the oxidizing agent.

As described above, after the second cyanide is oxidized, an acid solution is input to the washing solution, thereby completing the process of precipitating the first cyanide 41, and then the process of removing the second cyanide 42 is sequentially performed.

That is, the first cyanide (most of the SAD cyanide and some WAD cyanide) present in a solid state in soil is dissolved into an ionic state in the washing solution under the basic environment through the process of dissociating cyanide 20. If the washing solution returns to an acidic condition, the ionic first cyanide is precipitated again into a solid state through inverse reactions of those shown in Formulae (1) and (2). Since the first cyanide has a low solubility under an acidic condition, it is not dissolved again in a washing solution and maintained as a solid state.

In addition, the $CNO^-$ produced through the reactions shown in Formulae (3) and (4) is dissolved into ammonia and carbon dioxide under the acidic condition as shown in Formula (5).

$$CNO^- + 2H_2O \longrightarrow NH_3 + CO_2 + OH^- \qquad \text{Formula (5)}$$

The reaction of Formula (5) is actively performed as pH is decreased. In the exemplary embodiment, when a sulfuric acid solution is input to a washing solution to decrease pH, thereby precipitating the first cyanide, the second cyanide is finally removed. In the exemplary embodiment, sulfuric acid, compared to hydrochloric acid, is more effective as the acid solution in decreasing the pH since it contains a high hydrogen count.

Meanwhile, after the washing solution is made into an acid condition, the process of removing remaining cyanide 50 in which iron ions (herein, $Fe^{2+}$) are separately input to the washing solution is performed. During the process of removing remaining cyanide 50, as an amount of iron may be increased in the washing solution, inverse reactions of those shown in Formulae (1) and (2) may be stimulated, thereby accelerating the precipitation of the first cyanide.

As described above, through the processes of precipitating the first cyanide 41, removing the second cyanide 42 and removing the remaining cyanide 50, the first cyanide is precipitated in the washing solution, and the second cyanide is dissolved into ammonia and carbon dioxide.

Afterwards, post-treatment 60 in which the washing solution in which the first cyanide is precipitated in a solid state is input to a known centrifugal separator to dissociate the solid from the liquid is performed, thereby physically dissociating the first cyanide from the washing solution.

Since all of the cyanide is removed from the washing solution, the phosphate concentration and pH are adjusted again by adding NaOH and phosphate, thereby being reused in the process of dissociating cyanide 20.

Problems to be made in treatment of a contaminant such as nitrogen, phosphorus or TCE as well as cyanide, which is a subject of the present invention, are second contamination caused by using a treatment agent and a treatment cost. However, when the concentration and pH of the washing solution are adjusted and recycled, these problems such as the second treatment and the high treatment cost may be solved.

In addition, the solid precipitate dissociated from the washing solution includes high-concentration first cyanide, so that it may be treated with a determined waste, or treated by applying high-temperature oxidation suitable for treating solid cyanide having a low solubility.

The present inventor tested with treatment of cyanide obtained from the cyanide-contaminated soil.

Figure 5:
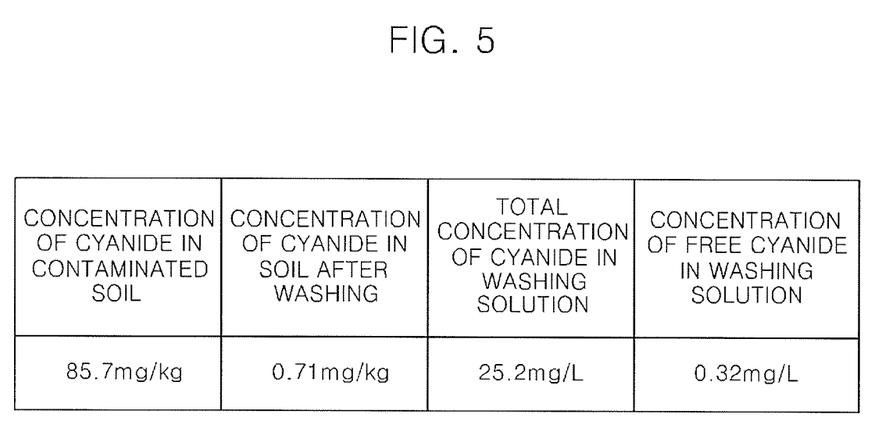
FIG. 5 shows a result of dissociation of cyanide using a washing solution.

To begin with, cyanide-contaminated soil was collected, and a content of cyanide was measured by the test method for soil contamination widely used in the art. Next, 30 mM of Na-pyrophosphate washing solution having a pH of 12 was prepared, and reacted with the cyanide-contaminated soil in a weight ratio of 10 to 1 for 24 hours. Afterwards, the soil and the washing solution were dissociated from each other using a centrifugal separator, and the content of cyanide in the soil was measured by the test method for soil contamination. The total cyanide content (concentration) in the washing solution was measured by the official test methods of water quality widely used in the art, and the content of the free cyanide was measured according to the ASTM. The result is shown in FIG. 5.

It can be confirmed that the cyanide-contaminated soil included cyanide having a concentration of 85.7 mg/kg before washing, but after being washed using the Na-pyrophosphate washing solution having a pH of 12, the concentration of the cyanide was deceased to 0.71 mg/kg, so that it can be confirmed that almost all cyanide in the soil was dissociated from the soil. It can be confirmed that the cyanide concentration in the soil after the washing was far below the environment standard ("A" area concern standard: 2 mg/kg) according to the soil environment conversation act, which indicates that the soil has no problem in being reused to remediate.

Further, the total cyanide concentration in the washing solution was 25.2 mg/L, and the free cyanide was insignificant, for example, 0.31 mg/L. It is a natural result obtained by considering that the content of the free cyanide in the cyanide-contaminated soil is very small, and it can be seen that most of the cyanide in the washing solution is SAD cyanide.

Afterwards, an experiment including processes of precipitating first cyanide 41, removing second cyanide 42 and removing remaining cyanide 50 was continuously performed.

First, an oxidizing agent was input to inhibit generation of high-toxicity HCN gas during the removal of the cyanide from the washing solution and oxidize the WAD cyanide and the free cyanide. That is, $H_2O_2$ was input to the washing solution until the concentration reached 0.4 mg/L, and they reacted with each other for 10 minutes. The concentration of the free cyanide was then measured by the ASTM.

Afterwards, $H_2SO_4$ was input to the washing solution to adjust pH of the washing solution to 4, and they reacted with each other for 10 minutes. The total cyanide concentration in the washing solution was measured by the official test methods of water quality.

Figure 6:
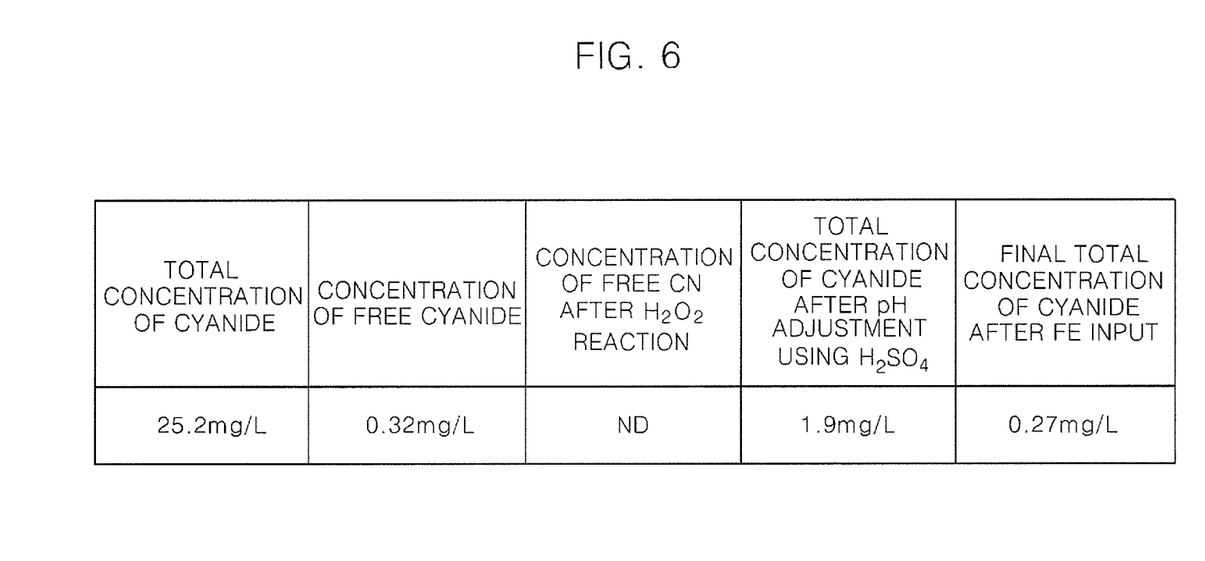
FIG. 6 shows a result of precipitation of first cyanide, removal of second cyanide and removal of remaining cyanide.

Finally, to additionally provide iron ions in the washing solution, $FeCl_2 \cdot 4H_2O$ was input to adjust the Fe concentration in the washing solution to 1 mg/L, and they reacted with each other for 10 minutes again. Afterwards, the total cyanide concentration was measured by the official test methods of water quality. The result is shown in FIG. 6.

The free cyanide present at the concentration of 0.31 mg/L in the washing solution was completely removed from the washing solution by reacting with $H_2O_2$, confirming that there is no chance to produce high-toxicity HCN even when $H_2SO_4$ is input. The concentration of the cyanide in the washing solution was 25.2 mg/L, but after the washing solution was oxidized by inputting $H_2SO_4$ to the washing solution, decreased to 1.9 mg/L, and a cyanide precipitant was formed in the washing solution.

After Fe required to precipitate Fe—CN was additionally provided by inputting $FeCb_2 \cdot 4H_2O$, the total cyanide concentration in the washing solution was 0.27 mg/L, lower than the discharged water quality standard (1 mg/L). That is, almost all cyanide dissolved in the washing solution was precipitated or dissolved so as to be removed from the washing solution. Accordingly, it was confirmed that the method according to the present invention can effectively remove the cyanide in the soil. The experiment described above was performed at room temperature and atmospheric pressure, and an additional external heat source was not required, unlike the high-temperature oxidation.

As described above, first, the process of dissociating cyanide from soil using the washing solution was introduced to perform a subsequent process only to cyanide (washing solution), thereby reducing inefficiency shown in the conventional method of treating a contaminant in the contaminated soil throughout the process.

The method of remediating cyanide-contaminated soil according to the present invention is performed at room temperature, and thus is more economical than the conventional high-temperature oxidation.

Further, cyanide is dissociated from soil, so that consumption of an oxidizing agent by an organic material, sulfide mineral, or manganese oxide is solved. Thus, the cyanide can be economically and effectively removed.

Since the present invention reuses a treatment solution used to treat cyanide, second contamination according to the cyanide treatment does not occur, which is environmentally friendly.

A method of remediating cyanide-contaminated soil according to the present invention can effectively dissociate cyanide from soil present in a solid state, which is difficult to treat with conventional low-cost room-temperature oxidation, and can remove cyanide more economically than a conventional high-cost method because a process is performed at room temperature.

First, a process of dissociating cyanide from soil using a washing solution is introduced to perform a subsequent process only to cyanide (washing solution), thereby reducing inefficiency shown by the conventional method of treating a contaminant to the contaminated soil throughout the process.

The method of remediating cyanide-contaminated soil according to the present invention is performed at room temperature, so that it is more economical than the conventional high-temperature oxidation.

Further, cyanide is dissociated from soil, so that consumption of an oxidizing agent by an organic material, sulfide mineral, or manganese oxide can be solved. Thus, the cyanide can be economically and effectively removed.

Since the present invention reuses a treatment solution used to treat cyanide, second contamination according to the cyanide treatment does not occur, which is environmentally friendly.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of remediating cyanide-contaminated soil, the method comprising:
   collecting the soil contaminated with cyanide;
   mixing the soil with an alkali washing solution to dissolve the cyanide in the alkali washing solution;
   dissociating the soil away from the alkali washing solution;
   adding an oxidizing agent into the alkali washing solution to oxidize a soluble portion of the cyanide; and
   acidifying the alkali washing solution with an acid to precipitate a fraction of the cyanide.

2. The method according to claim 1, further comprising separating the precipitated fraction of the cyanide from the acidified washing solution.

3. The method according to claim 1, wherein the alkali washing solution has a pH of 9 to 12.

4. The method according to claim 3, wherein the alkali washing solution has a pH of 11 to 12.

5. The method according to claim 1, wherein the alkali washing solution includes a phosphate salt.

6. The method according to claim 5, wherein the phosphate salt in the alkali washing solution includes pyrophosphate ($P_2O_7^{4-}$).

7. The method according to claim 5, wherein the phosphate salt in the alkali washing solution has a concentration of 30 to 50mM.

8. The method according to claim 1, further comprising adding iron salt to the acidified washing solution to precipitate a residual part of cyanide from the acidified washing solution.

9. The method according to claim 1, wherein acidifying the alkali washing solution is achieved by adding sulfuric acid ($H_2SO_4$) into the alkali washing solution.

10. The method according to claim 2, wherein separating comprises centrifuging.

11. The method according to claim 10, wherein the acidified washing solution is reused by adding alkali into the acidified washing solution to turn the acidified washing solution back into the alkali washing solution.

12. The method according to claim 1, wherein the oxidizing agent is selected from the group consisting of hydrogen peroxide ($H_2O_2$) and ozone ($O_3$).

13. The method according to claim 1, wherein the oxidation of cyanide results in forming cyanate $(OCN)^-$ in the alkaline washing solution.

14. The method according to claim 13, wherein a portion of the cyanate is converted into ammonia ($NH_3$) and carbon dioxide ($CO_2$) subsequent to acidifying the alkali washing solution.

15. The method according to claim 5, wherein the phosphate salt in the alkali washing solution is selected from the group consisting of orthophosphate ($PO_4^{3-}$) salt, pyrophosphate ($P_2O_7^{4-}$) salt, and hexametaphosphate ($PO_3^{1-})_6$ salt.

16. The method according to claim 1, wherein the method removes at least 99% of the cyanide from the contaminated soil.

17. The method according to claim 1, wherein the acid is selected from the group consisting of hydrochloric acid (HCl) and sulfuric acid ($H_2SO_4$).

18. A method of remediating cyanide-contaminated soil, the method comprising:
- collecting the soil contaminated with cyanide;
- extracting the cyanide from the soil by mixing the soil with an alkali washing solution to dissolve the cyanide into the alkali washing solution, wherein the alkali washing solution comprises a pH between 10 to 12 and a phosphate salt containing pyrophosphate ($P_2O_7^{4-}$);
- separating the alkali washing solution from the soil;
- adding hydrogen peroxide ($H_2O_2$) into the separated alkali washing solution to oxidize a portion of cyanide in the separated alkali washing solution;
- acidifying the separated alkali washing solution with sulfuric acid to form an acidified washing solution and to precipitate cyanide;
- adding an iron salt into the acidified washing solution to further precipitate cyanide from the acidified washing solution;
- separating the acidified washing solution away from the precipitated cyanide.

19. The method according to claim 18, further comprising recycling the acidified washing solution by adding alkali into the acidified washing solution to turn the acidified washing solution back into the alkali washing solution.

20. A method of remediating cyanide-contaminated soil, the method comprising:
- collecting the soil contaminated with cyanide;
- extracting the cyanide from the soil by mixing the soil with an alkali washing solution to dissolve the cyanide into the alkali washing solution, wherein the alkali washing solution comprises a pH between 10 to 12 and a phosphate salt;
- separating the alkali washing solution from the soil;
- adding an oxidizing agent into the separated alkali washing solution to oxidize a portion of cyanide in the separated alkali washing solution;
- acidifying the separated alkali washing solution with an acid to form an acidified washing solution and to precipitate cyanide;
- adding an iron salt into the acidified washing solution to further precipitate cyanide from the acidified washing solution;
- separating the acidified washing solution away from the precipitated cyanide; and
- recycling the acidified washing solution by adding alkali into the acidified washing solution to turn the acidified washing solution back into the alkali washing solution.

* * * * *